United States Patent [19]

Ozaki et al.

[11] Patent Number: 5,058,423
[45] Date of Patent: Oct. 22, 1991

[54] METHOD OF CHECKING THE FUNCTIONING OF A DRIVING WHEEL SLIP CONTROL SYSTEM

[75] Inventors: Masaaki Ozaki, Sayama; Yoh Kojima, Fujimi, both of Japan

[73] Assignee: Honda Giken Kogyo Kabushiki Kaisha, Tokyo, Japan

[21] Appl. No.: 551,240

[22] Filed: Jul. 10, 1990

[30] Foreign Application Priority Data

Jul. 11, 1989 [JP] Japan .................................. 1-178393

[51] Int. Cl.⁵ .......................................... G01M 15/00
[52] U.S. Cl. ..................................................... 73/117
[58] Field of Search .............................. 73/117, 118.1

[56] References Cited

U.S. PATENT DOCUMENTS

| 4,325,251 | 4/1982 | Kanegae | 73/119 A |
| 4,441,359 | 4/1984 | Ezoe | 73/117 |
| 4,567,756 | 2/1986 | Colborn | 73/118.1 |

FOREIGN PATENT DOCUMENTS 63-84544 6/1988 Japan .
2-157439 6/1990 Japan .
2-157440 6/1990 Japan .

Primary Examiner—Robert Raevis
Attorney, Agent, or Firm—Armstrong, Nikaido, Marmelstein, Kubovcik & Murray

[57] ABSTRACT

A method of checking the functioning of a driving wheel slip control system installed in a vehicle. Driving wheels are placed on support rollers and rotatably supported thereby. The driving wheels are driven by the engine. False signals indicative of tentative rotational speeds of trailing wheels are supplied to an ECU which in turn outputs a control signal for controlling the engine. Predetermined monitoring signals including at least the control signal output from the ECU are taken out from the driving wheel slip control system. It is determined whether the predetermined monitoring signals show values falling within respective predetermined allowable ranges. Further, a steering handle of the vehicle may be turned at the same time of rotation of the driving wheels, the steering angle of which is detected by a steering angle sensor. Further, instead of using the false signals, the trailing wheels may be placed on second support rollers for rotatably supporting the trailing wheels thereby. The second support rollers are capable of rotatively driving the trailing wheels.

8 Claims, 8 Drawing Sheets

| TC LEVEL | 1 | 2 | 3 | 4 | 5 | 6 |
|---|---|---|---|---|---|---|
| LVL6 | F/C | F/C | F/C | F/C | F/C | F/C |
| LVL5 | F/C | F/C | F/C | F/C | F/C | L |
| LVL4 | F/C | L | F/C | F/C | F/C | L |
| LVL3 | F/C | L | F/C | L | F/C | L |
| LVL2 | F/C | L | L | L | F/C | L |
| LVL1 | F/C | L | L | L | L | L |
| LVL0 | L | L | L | L | L | L |

M : NUMBER CORRESPONDING TO CYLINDER

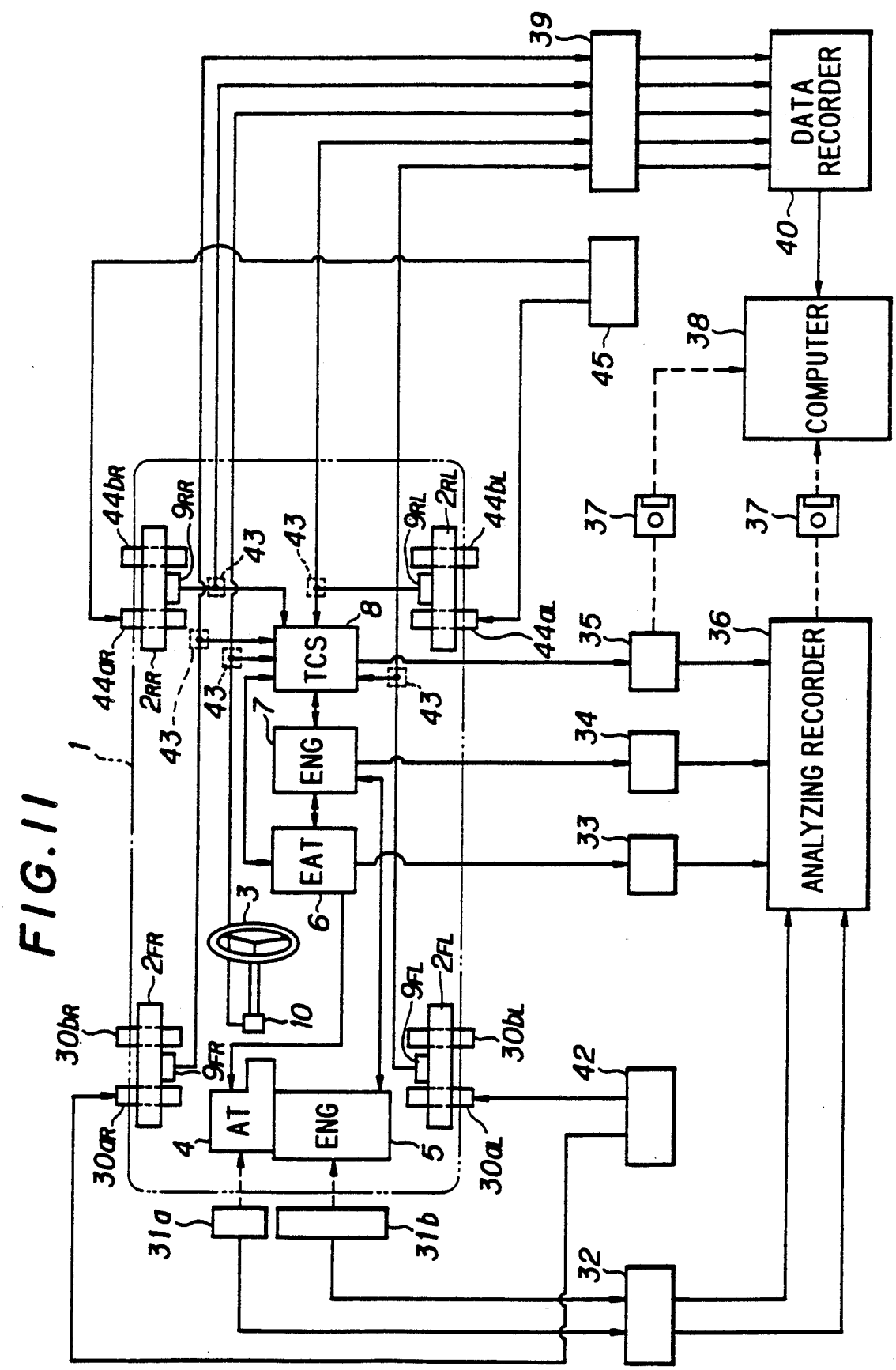

METHOD OF CHECKING THE FUNCTIONING OF A DRIVING WHEEL SLIP CONTROL SYSTEM

BACKGROUND OF THE INVENTION

This invention relates to a method of checking the functioning of a control system installed in an automotive vehicle, and more particularly to a method of checking the functioning of a driving wheel slip control system.

As recognized in general, a driving wheel of an automotive vehicle undergoes a slip when the vehicle is started to run or when it is accelerated, if the driving force of the driving wheel surpasses a frictional force developed between the tire of the driving wheel and the road surface [=the coefficient of friction between the tire and the road surface × load of the vehicle weight on the driving wheel (wheel load)].

Driving wheel slip control systems for controlling slips of driving wheels have already been proposed by the present assignee, e.g. in Japanese Provisional Patent Publications (Kokai) Nos. 2-157439 and 2-157440. According to these systems, driving wheel slip control is carried out by the following steps:

1) detecting the rotational speeds of right and left driving wheels, the rotational speeds of right and left trailing wheels, and the steering angle of a steering handle, 2) calculating a parameter (hereinafter referred to as "the slip value") indicative of the degree of a slip of the driving wheels based on the detected rotational speeds of the wheels and steering angle, and 3) increasing the number of cylinders of an internal combustion installed in the vehicle to be subjected to fuel cut to thereby decrease the output torque of the engine as the slip value is larger (the degree of the slip is larger).

The detection of the steering angle carried out at the above step 1) is for controlling the yawing motion of the vehicle based on the detected values of the steering angle and rotational speeds of the right and left trailing wheels. This control of the yawing motion is carried out by decreasing the output torque of the engine, e.g., for the purpose of reducing the tendency of the front-wheel-drive vehicle during yawing thereof toward understeering. The yawing motion control is a kind of driving wheel slip control in a broad sense.

On the other hand, a system for checking functioning or operation of such driving wheel slip control systems has already been proposed by Japanese Provisional Utility Model Publication (Kokai) No. 63-84544, in which all the four wheels of a vehicle are placed on respective drum rollers capable of rotation independently of one another (these drum rollers, the equivalent inertial weights of which are small, play the role as a frozen road or the like), and it is determined that the driving wheel slip control system of the vehicle is not normally functioning if the rotational speeds of the right and left driving wheels exceed a predetermined upper limit value within a predetermined time period after the accelerator pedal of the vehicle is stepped on.

According to the above proposed system, the checking is so roughly carried out that it is only possible to determine whether the driving wheel slip control system has operated or not. However, it is not possible to determine whether driving wheel slip control systems like the aforementioned ones proposed by the present assignee which are capable of sensitive control are properly functioning to perform various kinds of control as designed. More specifically, the above proposed checking system cannot determine e.g. whether the slip value is properly calculated based on the rotational speeds of the right and left driving wheels, those of the right and left trailing wheels, and the steering angle of the steering handle, and whether fuel cut and/or other control are properly carried out based on the calculated slip value.

Further, since the conventional checking system uses data based solely on the rotational speeds of the wheels, it is impossible to determine which part of the control system is faulty when it is determined to be out of order.

SUMMARY OF THE INVENTION

It is the object of the invention to provide a method of checking the functioning of a driving wheel slip control system, which is capable of positively determining whether the driving wheel control system which is capable of complicated and sensitive control is properly functioning as designed.

A further object of the invention is to easily locate the faulty part of the control system when it is determined to be out of order.

To attain the above objects, according to a first aspect of the invention, there is provided a method of checking the functioning of a driving wheel slip control system which is installed in a vehicle having driving wheels and trailing wheels, the driving wheel slip control system having a prime mover (i.e. engine) for driving the driving wheels, at least one driving wheel speed sensor for detecting the rotational speed of at least one of the driving wheels and generating at least one signal indicative of the rotational speed of the at least one driving wheel, at least one trailing wheel speed sensor for detecting the rotational speed of at least one of the trailing wheels and generating at least one signal indicative of the rotational speed of the at least one trailing wheel, and a control device responsive to the signals indicative of the rotational speeds of the at least one driving wheel and the at least one trailing wheel for outputting a control signal for controlling the output of the engine.

The method according to the first aspect of the invention is characterized by comprising the steps of:

(1) placing the driving wheels on a support device for rotatably supporting the driving wheels by the support device;

(2) causing the engine to rotatively drive the driving wheels;

(3) supplying at least one false signal indicative of the rotational speed of the at least one trailing wheel to the control device in place of the at least one signal indicative of the rotational speed of the at least one trailing wheel;

(4) taking out predetermined monitoring signals including at least the control signal output from the control device, from the driving wheel slip control system; and (5) determining whether the predetermined monitoring signals show values falling within respective predetermined allowable ranges.

According to a second aspect of the invention, the method is characterized by comprising the steps of:

(1) placing the driving wheels on a first support device for rotatably supporting the driving wheels by the first support device;

(2) placing the trailing wheels on a second support device for rotatably supporting the trailing wheels by the second support device, the second support device being capable of rotatively driving the trailing wheels;

(3) causing the engine to rotatively drive the driving wheels;

(4) causing the second support device to rotatively drive the trailing wheels;

(5) taking out predetermined monitoring signals including at least the control signal output from the control device, from the driving wheel slip control system; and (6) determining whether the predetermined monitoring signals show values falling within respective predetermined allowable ranges.

According to a third aspect of the invention, there is provided a method of checking the functioning of a driving wheel slip control system which is installed in a vehicle having driving wheels, trailing wheels, and a steering handle, the driving wheel slip control system having an engine for driving the driving wheels, at least one driving wheel speed sensor for detecting the rotational speed of at least one of the driving wheels and generating at least one signal indicative of the rotational speed of the at least one driving wheel, at least one trailing wheel speed sensor for detecting the rotational speed of at least one of the trailing wheels and generating at least one signal indicative of the rotational speed of the at least one trailing wheel, a steering angle sensor for detecting a steering angle of the steering handle and generating a signal indicative of the steering angle, and a control device responsive to the signals indicative of the rotational speeds of the at least one driving wheel and the at least one trailing wheel and the steering angle for outputting a control signal for controlling the output of the engine.

The method according to the third aspect of the invention is characterized by comprising the steps of:

(1) placing the driving wheels on a support device for rotatably supporting the driving wheels by the support device;

(2) causing the engine to rotatively drive the driving wheels;

(3) supplying at least one false signal indicative of the rotational speed of the at least one trailing wheel to the control device in place of the at least one signal indicative of the rotational speed of the at least one trailing wheel;

(4) turning the steering handle;

(5) taking out predetermined monitoring signals including at least the control signal output from the control device, from the driving wheel slip control system; and (6) determining whether the predetermined monitoring signals show values falling within respective predetermined allowable ranges.

According to a fourth aspect of the invention, the method is characterized by comprising the steps of:

(1) placing the driving wheels on a first support device for rotatably supporting the driving wheels by the first support device;

(2) placing the trailing wheels on a second support device for rotatably supporting the trailing wheels by the second support device, the second support device being capable of rotatively driving the trailing wheels;

(3) causing the engine to rotatively drive the driving wheels;

(4) causing the second support device to rotatively drive the trailing wheels;

(5) turning the steering handle;

(6) taking out predetermined monitoring signals including at least the control signal output from the control device, from the driving wheel slip control system; and (7) determining whether the predetermined monitoring signals show values falling within respective predetermined allowable ranges.

Preferably, the predetermined monitoring signals include the at least one signal indicative of the rotational speed of the at least one trailing wheel.

Also preferably, the predetermined monitoring signals include the signal indicative of the steering angle.

Preferably, the predetermined monitoring signals include the at least one signal indicative of the rotational speed of the at least one driving wheel.

Also preferably, the predetermined monitoring signals include at least one signal indicative of operating conditions of the engine.

The above and other objects, features, and advantages of the invention will become more apparent from the ensuing detailed description taken in conjunction with the accompanying drawings.

BRIEF DESCRIPTION OF THE DRAWINGS

FIG. 11 is a block diagram of the whole arrangement of a vehicle inspecting system to which is applied a method according to a second embodiment of the invention, and related parts of a vehicle under inspection.

DETAILED DESCRIPTION

The invention will be described in detail below with reference to the drawings.

Figure 1:
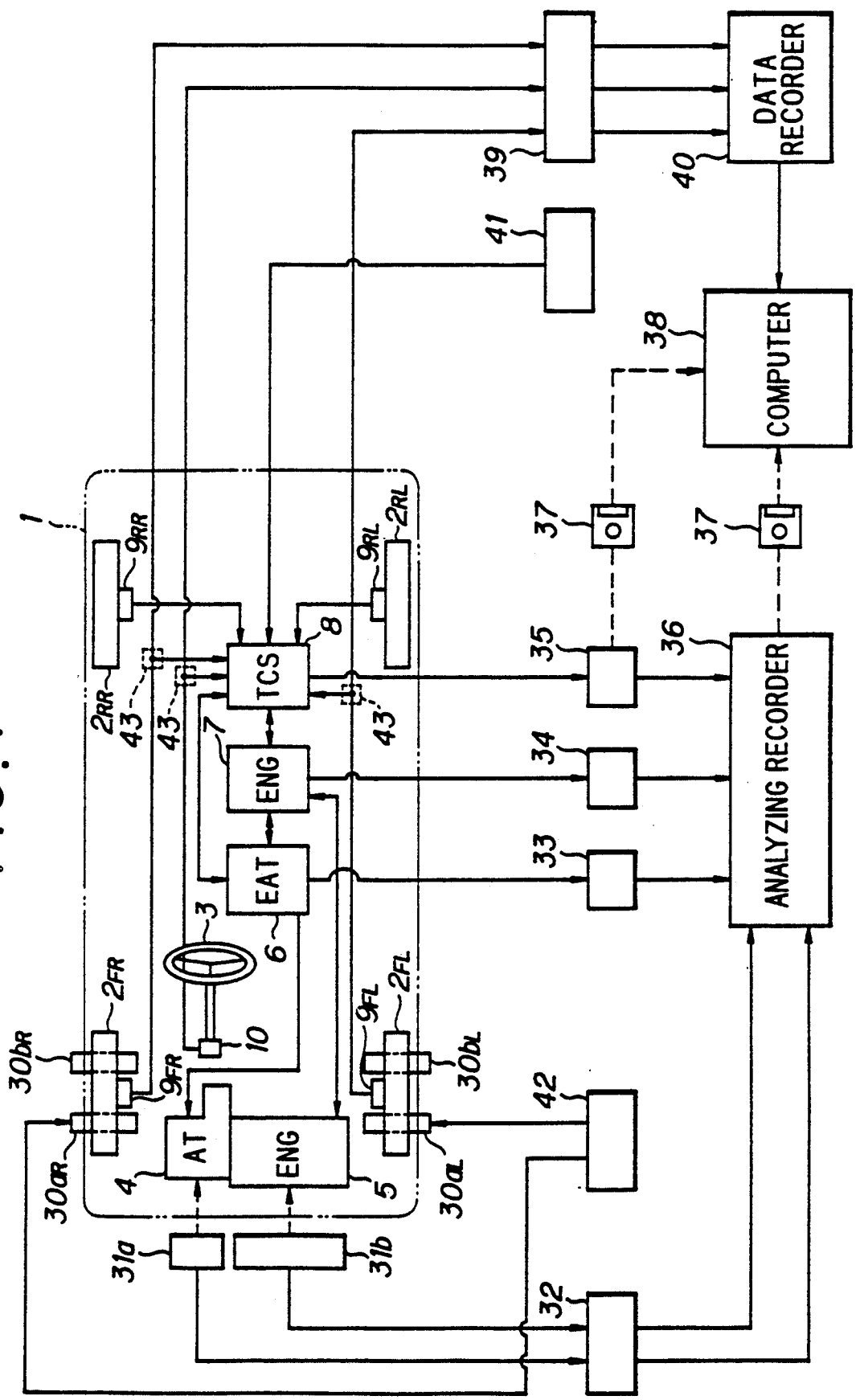
FIG. 1 is a block diagram of the whole arrangement of a vehicle inspecting system to which is applied a method according to a first embodiment of the invention, and related parts of a vehicle under inspection.

FIG. 1 shows the whole arrangement of a vehicle inspecting system to which is applied a method according to a first embodiment of the invention, and related parts of a vehicle under inspection. The vehicle under inspection is a front-wheel-drive vehicle of which right and left front wheels $2_{FR}$, $2_{FL}$ are driven by an engine (prime mover) 5. The vehicle is equipped with an automatic transmission 4. Driving wheel speed sensors $9_{FR}$, $9_{FL}$ are provided for the respective right and left driving wheels $2_{FR}$, $2_{FL}$, while trailing wheel speed sensors $9_{RR}$, $9_{RL}$ are provided for respective right and left trailing (rear) wheels $2_{RR}$, $2_{RL}$. The driving and trailing wheel speed sensors detect the rotational speeds of the respective wheels, and supply signals indicative of the detected rotational speeds of the wheels to an electronic control unit (hereinafter referred to as "the TCS-ECU") 8 for detecting slips of the driving wheels. Also connected to the TCS-ECU 8 is a steering angle sensor 10 for detecting the steering angle of a steering handle 3, and supplying a signal indicative of the detected steering angle to the TCS-ECU 8. The steering angle sensor 10 generates a signal indicative of an absolute angle of steering such that the rightward steering angle is represented by a positive value (e.g. $+1°$, $+2°$ ...) and the leftward steering angle by a negative value (e.g $-1°$, $-2°$ ...), with the neutral position of the steering handle represented by zero degree.

The vehicle 1 further includes an electronic control unit (hereinafter referred to as "the ENG-ECU") 7 for controlling the operation of the engine 5 by fuel supply control and ignition timing control, and an electronic control unit (hereinafter referred to as "the EAT-ECU") 6 for controlling the operation of the automatic transmission 4 by gear selection control, lock-up control, etc. The ENG-ECU 7, the EAT-ECU 6, and the TCS-ECU 8 are connected to each other. The ECU's 6 to 8 also have signal output terminals provided for use in checking of the functioning described in detail hereinafter.

Figure 5:
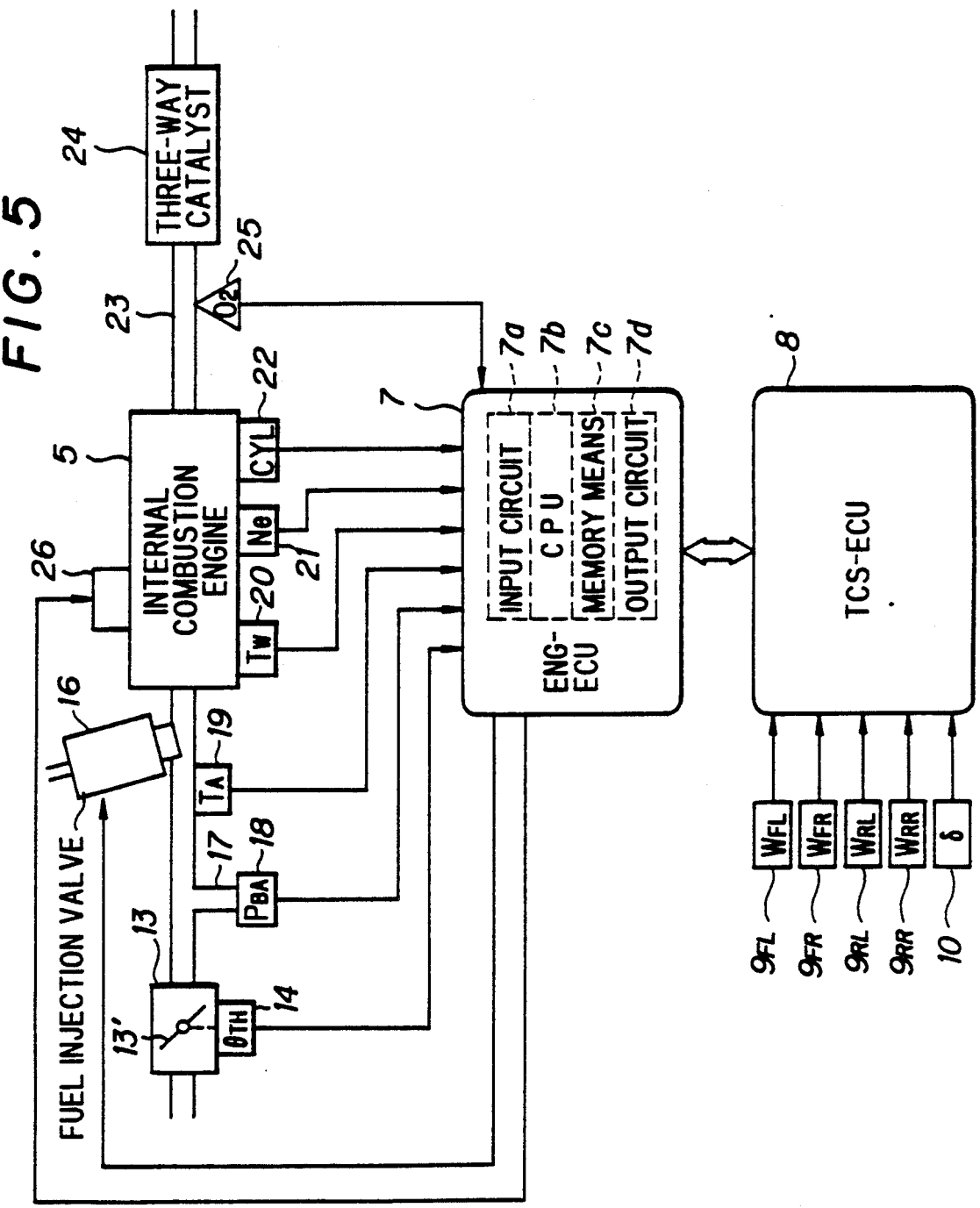
FIG. 5 is a schematic diagram showing the whole arrangement of the engine and driving wheel slip control system of the vehicle under inspection.

FIG. 5 shows an example of arrangement of parts of the vehicle 1 which functions as the driving wheel slip control system, and wherein component elements and parts corresponding to those shown in FIG. 1 are indicated by the same reference numerals as in FIG. 1.

Connected to the cylinder block of the engine 5 is an intake pipe 12 across which is arranged a throttle body 13 accommodating a throttle valve 13' therein. A throttle valve opening ($\theta_{TH}$) sensor 14 is connected to the throttle valve 13' for generating an electric signal indicative of the sensed throttle valve opening and supplying same to the ENG-ECU 7.

Fuel injection valves 16, only one of which is shown, are inserted into the intake pipe at locations intermediate between the cylinder block of the engine 5 and the throttle valve 13' and slightly upstream of respective intake valves, not shown. The fuel injection valves 16 are connected to a fuel pump, not shown, and electrically connected to the ENG-ECU 7 to have their valve opening periods controlled by signals therefrom.

Ignition plugs 26 for respective cylinders, not shown, of the engine 5 are electrically connected to the ENG-ECU 7 to have their ignition timing $\theta_{IG}$ controlled by signals therefrom.

An intake pipe absolute pressure ($P_{BA}$) sensor 18 is provided in communication with the interior of the intake pipe 12 via a conduit 17 at a location immediately downstream of the throttle valve 13' for supplying an electric signal indicative of the sensed absolute pressure within the intake pipe 12 to the ENG-ECU 7. An intake air temperature ($T_A$) sensor 19 is inserted into the intake pipe 12 at a location downstream of the intake pipe absolute pressure sensor 18 for supplying an electric signal indicative of the sensed intake air temperature $T_A$ to the ENG-ECU 5.

An engine coolant temperature ($T_W$) sensor 20, which may be formed of a thermistor or the like, is mounted in the cylinder block of the engine 5, for supplying an electric signal indicative of the sensed engine coolant temperature $T_W$ to the ENG-ECU 7. An engine rotational speed (Ne) sensor 21 and a cylinder-discriminating (CYL) sensor 22 are arranged in facing relation to a camshaft, not shown, or a crankshaft, not shown, of the engine 5. The engine rotational speed sensor 21 generates a pulse as a TDC signal pulse at each of predetermined crank angles whenever the crankshaft rotates through a predetermined angle. The cylinder-discriminating sensor 22 generates a pulse at a predetermined crank angle of a particular cylinder of the engine. Both the pulses generated by the sensors 21 and 22 are supplied to the ENG-ECU 5.

A three-way catalyst 24 is arranged within an exhaust pipe 23 connected to the cylinder block of the engine 5 for purifying noxious components such as HC, CO, and NOx. An $O_2$ sensor 25 as an exhaust gas ingredient concentration sensor is mounted in the exhaust pipe 23 at a location upstream of the three-way catalyst 24, for sensing the concentration of oxygen present in exhaust gases emitted from the engine 5 and supplying an electric signal indicative of the sensed oxygen concentration to the ENG-ECU 7.

The ENG-ECU 7 comprises an input circuit 7a having the functions of shaping the waveforms of input signals from various sensors and the TCS-ECU 8, shifting the voltage levels of sensor output signals to a predetermined level, converting analog signals from analog-output sensors to digital signals, and so forth, a central processing unit (hereinafter referred to as "the CPU") 7b, memory means 7c storing various operational programs which are executed in the CPU 7b and for storing results of calculations therefrom, etc., and an output circuit 7d which outputs driving signals to the fuel injection valves 16 and the ignition plugs 26.

The CPU 7b operates in response to the above-mentioned signals from the sensors to determine operating conditions in which the engine 5 is operating, such as an air-fuel ratio feedback control region for controlling the air-fuel ratio in response to the output from the $O_2$ sensor 25 to a stoichiometric aif-fuel ratio, and open-loop control regions, and calculates, based upon the determined operating conditions, the valve opening period or fuel injection period $T_{OUT}$ over which the fuel injection valves 16 are to be opened, by the use of the following equation (1) in synchronism with inputting of TDC signal pulses to the ENG-ECU 7.

$$T_{OUT} = T_i \times K_1 \times K_{TCS} + K_2 \quad (1)$$

where Ti represents a basic fuel injection period of the fuel injection valves 16, which is determined based upon the engine rotational speed Ne and the intake pipe absolute pressure $P_{BA}$.

$K_{TCS}$ represents a leaning coefficient which is set to a value smaller than 1.0, as described in detail hereinafter, when an excessive slip state of the driving wheels is detected, and set to 1.0 when no excessive slip state is detected.

$K_1$ and $K_2$ represent correction coefficients and correction variables, respectively, which are calculated based on various engine operating parameter signals to such values as to optimize operating characteristics of the engine such as fuel consumption and accelerability, depending on operating conditions of the engine.

The CPU 5b determines ignition timing $\theta_{IG}$ depending on the engine rotational speed Ne and the intake pipe absolute pressure $P_{BA}$.

The CPU 5b supplies through the output circuit 7d driving signals for driving the fuel injection valves 16 and the ignition plugs 26 based upon the results of the above determinations and calculations.

The TCS-ECU 8 calculates a slip value DUTY as a parameter indicative of a slip state of the driving wheels, based on detected driving wheel speeds $W_{FR}$, $W_{FL}$ of the right and left driving wheels $2_{FR}$, $2_{FL}$, trailing wheel speeds $W_{RR}$, $W_{RL}$ of the right and left trailing wheels $2_{RR}$, $2_{RL}$, and steering angle $\delta$, in the following manner, and then supply the calculated slip value DUTY to the ENG-ECU 7:

(1) An average value (hereinafter simply referred to as "the driving wheel speed") $V_W$ of the driving wheel speeds $W_{FR}$, $W_{FL}$ is calculated.

(2) An average value (hereinafter simply referred to as "the vehicle speed") $V_V$ of the trailing wheel speeds $W_{RR}$, $W_{RL}$ is calculated.

(3) A reference driving wheel speed Vref is calculated based on the vehicle speed $V_V$. The reference driving wheel speed Vref is calculated based on the relationship between the trailing wheel speed and the driving wheel speed, which holds in a state where there is almost no slip of the driving wheels and at the same time the vehicle 1 is running straight.

(4) A yaw rate (yawing speed of the vehicle 1) Y is calculated based on a difference $\Delta$Vr between the trailing wheel speeds WRR, WRL.

(5) A reference yaw rate (a yaw rate intended by the driver by turning the steering handle) Yb is calculated based on the vehicle speed $V_V$ and the steering angle $\delta$.

(6) A correction term KB is calculated based on the yaw rate Y, reference yaw rate Yb, vehicle speed $V_V$, and steering angle $\delta$, and the reference driving wheel speed Vref is corrected by the correction term KB.

(7) A slip value DUTY is calculated based on a corrected reference driving wheel speed V'ref and the driving wheel speed $V_W$. The slip value DUTY assumes a larger value as the degree of a slip of the driving wheels is larger.

The thus calculated slip value DUTY basically represents a slip state of the driving wheels in the state where the steering handle is in the neutral position, i.e. the correction term KB=0, the slip state being detected based on the relationship between the driving wheel speed $V_W$ and the reference driving wheel speed Vref. Further, the slip value DUTY obtained through correction of the reference driving wheel speed Vref by the correction term KB represents a slip state of the vehicle 1 in the case were the steering handle is being turned (the driver intends yawing the vehicle 1). For example, let it be assumed that the steering handle is turned leftward by a certain angle $\delta_0$, and the expected trailing wheel speeds $W_{RR}$, $W_{RL}$ of the right and left trailing wheels are 30 km/h and 20 km/h. If both the detected trailing wheel speeds $W_{RR}$, $W_{RL}$ are 25 km/h, it means that the vehicle is running straight although the driver has turned the steering handle. Thus, it is detected that the vehicle 1 is in a slip or skidding state. If such a slip or skidding state of the vehicle 1 is detected, the correction term KB is subtracted from the reference driving wheel speed Vref, and therefore the difference ($V_W$−V'ref) between the driving wheel speed $V_W$ and the corrected reference driving wheel speed V'ref (=Vref −KB) becomes larger than the difference ($V_W$−Vref) between the driving wheel speed $V_W$ and the reference driving wheel speed Vref, so that the slip value DUTY assumes a larger value.

The above numerical values are mentioned by way of an example for explanation purposes, and therefore it does not necessarily follow that the above described state actually occurs.

Figure 6:
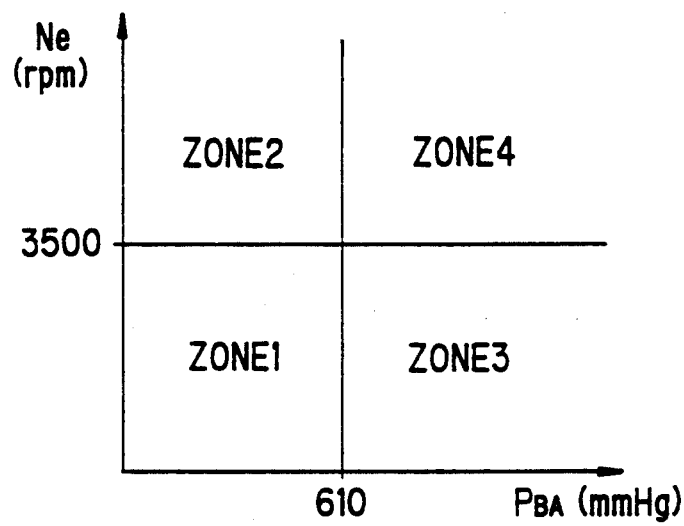
FIG. 6 is a diagram showing operating regions of the engine defined by the intake pipe absolute pressure ($P_{BA}$) and the engine rotational speed (Ne)

The ENG-ECU 7 carries out engine output control (hereinafter referred to as "reaction control") by fuel cut or leaning of the air-fuel mixture supplied to the engine 5 based on the slip value DUTY. The traction control is carried out, e.g. in the following manner:

(1) Predetermined threshold values TCFCLVL 0 to TCFCLVL 6 are set for each of predetermined engine operating regions (e.g. for each of zones ZONE 1 to ZONE 4 shown in FIG. 6) which are set in accordance with the engine rotational speed Ne and the intake pipe absolute pressure $P_{BA}$.

Figure 7:
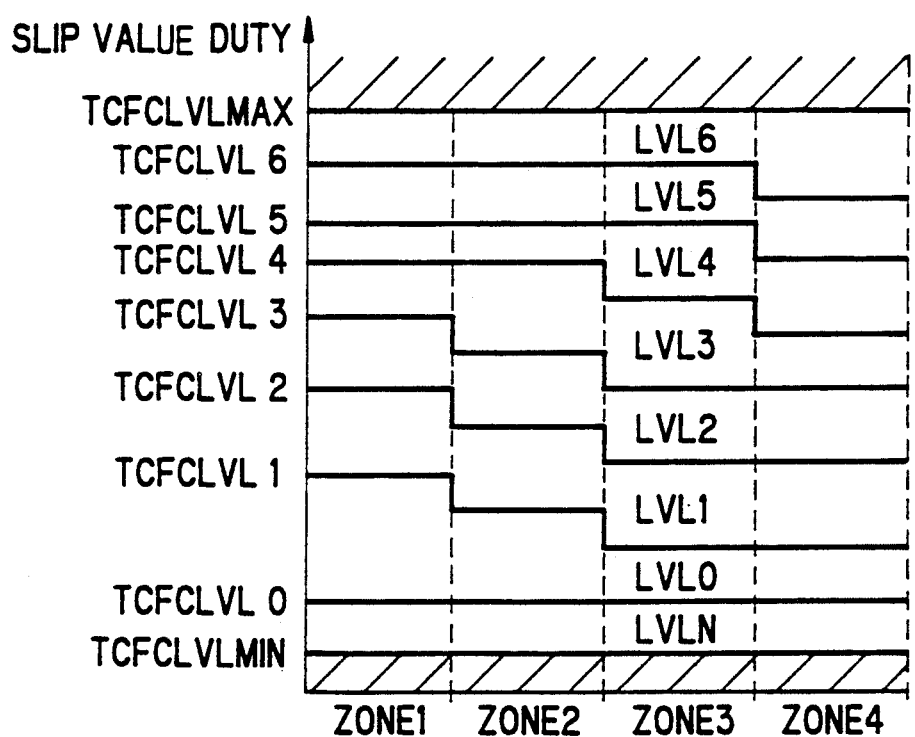
FIG. 7 is a diagram showing a table showing the relationship between a slip value DUTY and traction control levels (LVL N–LVL 6)

(2) traction control levels (hereinafter simply referred to as "TC levels") LVL N to LVL 6 are determined, e.g. as shown in FIG. 7, in accordance with the relationship between the slip value DUTY and the predetermined threshold values TCFCLVL 0 to TCFCLVL 6. For example, when the slip value DUTY assumes a value between TCFCLVL 2 and TCFCLVL 3, the TC level is determined to be LVL 2. In addition, TCFCLVLMIN and TCFCLVLMAX in FIG. 7 represent the minimum and maximum values of the slip value DUTY, respectively.

Figures 8, 9:
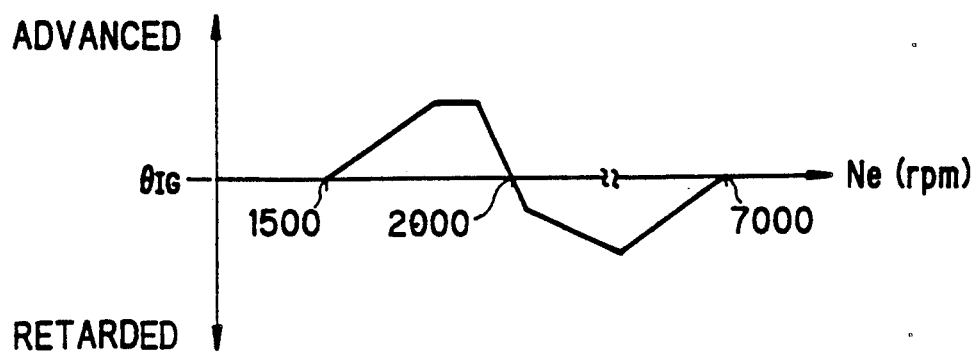
FIG. 8 is a diagram showing a table for determining a cylinder or cylinders for which leaning of the air-fuel mixture or fuel cut is to be effected in accordance with the traction control level.
FIG. 9 is a graph showing, by way of example, correction of ignition timing when leaning of the air-fuel ratio is carried out.

(3) In accordance with the determined TC level, fuel cut or leaning of the mixture supplied to each cylinder is carried out, cylinder by cylinder, e.g. as shown in the table of FIG. 8. FIG. 8 is a control pattern of fuel supply applied to a 6 cylinder-type engine. In the table, symbol L and symbol F/C represent leaning of the mixture and fuel cut, respectively, and values 1 to 6 of the cylinder-corresponding number M designate a sequence of cylinders to be controlled. For example, in the case of the TC level being LVL 3, cylinders corresponding respectively to M=1, 3, 5 are subjected to fuel cut, while cylinders corresponding respectively to M=2, 4, 6 are subjected to leaning of the mixture. The leaning of the mixture is effected by setting the correction coefficient $K_{TCS}$ of the aforementioned equation (1) to a value smaller than 1.0.

(4) In concurrence with leaning of the mixture of the step (3), the ignition timing is controlled, as shown in FIG. 9, in accordance with the engine rotational speed Ne. More specifically, the ignition timing is advanced when the engine rotational speed Ne is in a range of 1,500 tpm–2,000 rpm in order to prevent dielectric breakdown of the ignition system, whereas the ignition timing is retarded when the engine rotational speed Ne is in a range of 2,000 rpm–7,000 rpm in order to prevent occurrence of knocking.

(5) The above traction control is inhibited when any of the engine rotational speed Ne, the engine coolant temperature $T_W$, the intake air temperature $T_A$, the throttle valve opening $\theta_{TH}$, etc. is not within a respective predetermined range. Further, if the excessive slip state of the driving wheels is dissipated by execution of the traction control, the fuel supply to each cylinder of the engine is not immediately resumed, but is so controlled that the engine output gradually increases.

Driving wheel slip control systems, like one described above, for a vehicle equipped with ECU's similar to the TCS-ECU 8 and the ENG-ECU 7 are disclosed in more detail in aforementioned Japanese Provisional Patent Publications (Kokai) Nos. 2-157439 and 2-157440 by the present assignee.

Referring again to FIG. 1, the EAT-ECU 6 for controlling the automatic transmission 4 sends an ignition timing-retarding signal for retarding the ignition timing $\theta_{IG}$ to the ENG-ECU 7 when the gear ratio of the automatic transmission 4 is changed, in order to reduce a shock resulting from the change in the gear ratio. When the ignition timing-retarding signal by the EAT-ECU occurs concurrently with the signal for retarding the ignition timing $\theta_{IG}$ by traction control, the ignition timing $\theta_{IG}$ is controlled preferentially by the signal by traction control.

Figure 2:
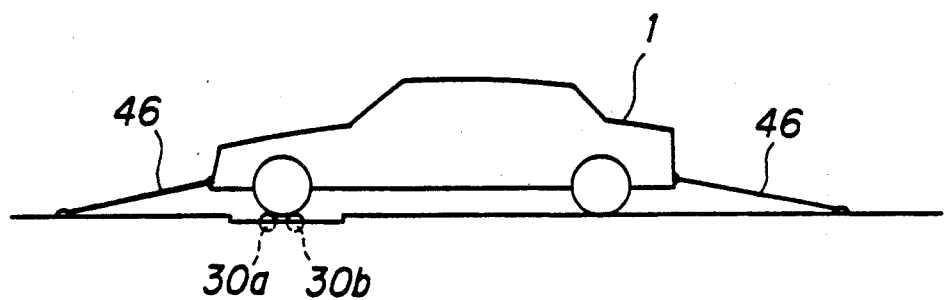
FIG. 2 is a view showing a manner of fixing the vehicle under inspection.

The vehicle 1, under inspection, which has the above described functions for the driving wheel slip control is held in place by fixing means 46 as shown in FIG. 2, in such a manner that the right and left driving wheels $2_{FR}$, $2_{FL}$ are placed on a pair of rotatable support rollers $30_{aR}$, $30_{bR}$ and a pair of rotatable support rollers $30_{aL}$, $30_{bL}$, respectively.

Figure 3:
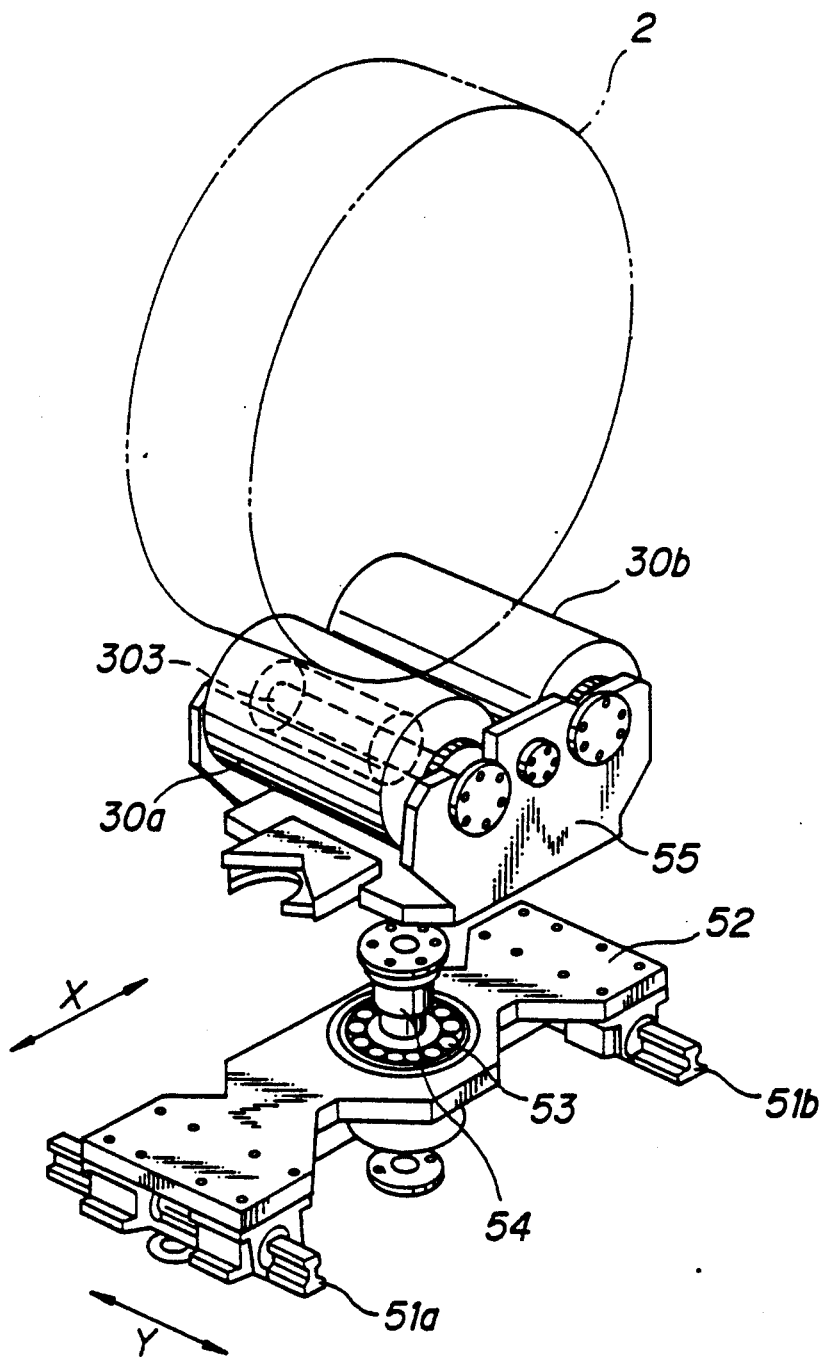
FIG. 3 is a partially-exploded perspective view of a support roller arrangement.

FIG. 3 shows essential parts of a support roller arrangement including the support rollers $30_a$, $30_b$. A floating table 52 is arranged on a pair of guide rails $51_a$, $51_b$ for sliding therealong in directions indicated by the arrow Y. The guide rails $51_a$, $51_b$ are secured on an intermediate support member, not shown, which is arranged on guide rails, not shown, for sliding therealong, the guide rails extending in directions indicated by the arrow X (orthogonal to the directions indicated by the arrow Y). Thus, the floating table 52 can move in both directions indicated by the arrows X and Y.

A rotary shaft 54 is fitted through the center of the floating table 52 via a bearing 53. The rotary shaft 54 is inhibited from upward or downward movement, but is rotatable via the bearing 53 relative to the floating table 52. The upper end of the rotary shaft 54 is rigidly secured to a support roller assembly 55 which has a generally U-shaped cross-section. The support roller assembly 55 has a bottom wall and a pair of opposed side walls upwardly extending integrally from the respective ends of the bottom wall. The aforementioned pair of support rollers $30_a$, $30_b$ are parallely rotatably supported between the opposed side walls and spaced from each other by a predetermined distance. The support rollers $30_a$, $30_b$ are adapted to support a corresponding wheel 2 of the vehicle 1 under checking.

Figure 4:
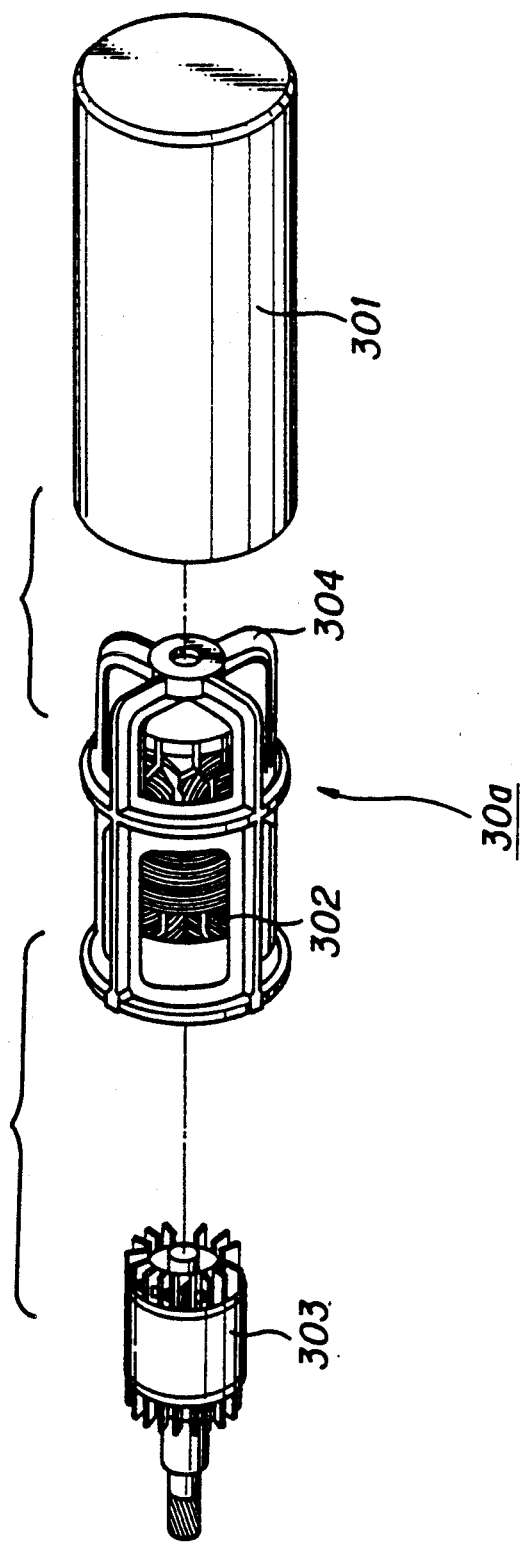
FIG. 4 is an exploded perspective view showing the internal construction of the support roller.

The suppor roller $30_a$ contains motor, and is driven for rotation by the motor. Accordingly, the wheel 2 placed on the support rollers $30_a$, $30_b$ is driven for rotation by its frictional contact with the support rollers $30_a$, $30_b$. FIG. 4 shows the interior construction of the support roller $30_a$ containing the motor. The support roller $30_a$ comprises a cylindrical casing 301, a coil 302 tightly fitted in and secured to the casing 301 by means of a support frame 304, and an armature 303 arranged within the coil 302 in spaced relation thereto. The armature 303 arranged within the support roller $30_a$ is also shown in FIG. 2. In the case of this construction, the armature 303 is held stationary, while the coil 302 and hence the cylindrical casing are rotatable.

Means for rotating the support roller may be provided separately from the support roller. Also, the support roller to be driven for rotation is not limited to $30_a$, but the support roller $30_b$ or both of the support rollers $30_a$, $30_b$ may be driven for rotation.

Referring again to FIG. 1, groups $31_a$, $31_b$ of sensors are mounted on the automatic transmission 4 and the engine 5 of the vehicle 1, respectively, for detecting respective operating parameters. The sensor group $31_a$ for the automatic transmission 4 includes an oil pressure sensor for detecting the pressure of operating oil, an oil temperature sensor for detecting the temperature of operating oil. The sensor group $31_b$ for the engine 5 includes, e.g. an engine rotational speed sensor, an intake pressure sensor, an engine coolant temperature sensor, an intake air temperature sensor, a sensor for detecting the temperature of the catalyst of the exhaust gas purifying device (the three-way catalyst 24), an engine oil temperature sensor, and air-fuel ratio sensors for detecting the air-fuel ratios of mixtures supplied to the respective cylinders. These sensors are attached to portions of the automatic transmission 4 and the engine 5 which allow the sensors to be easily mounted thereon or removed therefrom (e.g. the engine rotational speed sensor is attached to a wire for transmitting a signal for driving the ignition plug, and the engine oil temperature sensor to an oil level gauge), or branched portions provided exclusively for sensors.

Signals from the sensor groups $31_a$, $31_b$ are supplied via a preamplifier 32 to an analyzing recorder 36.

Checking signal output terminals of the EAT-ECU 6, ENG-ECU 7, and TCS-ECU 8 are connected via monitors 33, 34, 35 to the analyzing recorder 36. The EAT-ECU 6 supplies a control signal for controlling the automatic transmission 4, to the analyzing recorder 36, the TCS-ECU 8 supplies a signal indicative of the slip value DUTY to same, and the ENG-ECU 7 supplies output signals from the various sensors (see FIG. 5) which detect operating conditions of the engine 5, and driving signals for the fuel injection valves 16 and ignition plugs 26 of the engine 5, to same.

The output signals from the ECU's 6 to 8 and sensor output signals may be taken out from attachments connected to couplers of wire harnesses for transferring these signals.

Wires electrically connecting the right and left driving wheel speed sensors $9_{FR}$, $9_{FL}$, and the steering angle sensor 10 of the steering handle 3 to the TCS-ECU 8, respectively, are bifurcated by respective attachments 43, 43 wherefrom signals from these sensors $9_{FR}$, $9_{FL}$, 10 are supplied via a preamplifier 39 to a data recorder 40. The data recorder 40 records the signals from the sensors $9_{FR}$, $9_{FL}$, 10, and supplies data on the recorded signals to a computer 38, when required.

Also connected to the TCS-ECU 8 is a pulse generator 41 which supplies pulse signals to the TCS-ECU 8 as false signals for the signals from the right and left trailing wheel speed sensors $9_{RR}$, $9_{RL}$. Thus, the rotational speeds of the right and left trailing wheels can be falsewise set to any desired values by changing the frequencies of the pulse signals from the pulse generator 41. Further, a motor-driving device 42 is connected to the support rollers $30_{aR}$, $30_{aL}$ for exerting running resistance forces upon the driving wheels $2_{FR}$, $2_{FL}$ of the vehicle 1.

The monitor 35 and the analyzing recorder 36 both connected to the TĈS-ECU 8 are equipped with data-storing devices (e.g. floppy disk devices), for storing data on checking results in respective floppy disks 37. The data stored in the floppy disks 37 are analyzed by the computer 38, together with the data stored in the data recorder 40. The data-storing device of the monitor 35 is used when only the output signal from the TCS-ECU 8 is analyzed, and normally, analysis is carried out based on the data stored by the analyzing recorder 36. Further, if it is necessary to make data stored by the analyzing recorder 36 synchronous with the data by the data recorder 40, one of the corresponding signals inputted to the analyzing recorder 36 is also input to the data recorder 40.

The checking system having the above described construction basically carries out 1) false realization of various running modes of the vehicle 1 under checking, and 2) checking of operations of various parts of the vehicle related to the driving wheel slip control when the engine is in each of the running modes.

The false realization of the running modes of the vehicle 1 is effected, e.g. in the following manner:

(1) The accelerator pedal is operated by the operator or an actuator to cause rotation of the driving wheels $2_{FR}$, $2_{FL}$, with the steering angle $\delta$ of the steering handle 3 kept equal to 0 (which means that the vehicle is running straight).

(2) The false signals for the output signals from the trailing wheel speed sensors are supplied to the TCS-ECU 8 from the pulse generator 41.

(3) Various slip states of the driving wheels are created by changing the relationship between the driving wheel speeds $W_{FR}$, $W_{FL}$ obtained at the above step (1) and the frequencies of the false signals indicative of the tentative trailing wheel speeds $W_{RR}$, $W_{RL}$ obtained at the step (2).

(4) Running resistance forces are exerted upon the driving wheels by actuating the motors contained in the support rollers $30_{aR}$, $30_{aL}$ to thereby create various slip states of the driving wheels as encountered when the vehicle 1 is running up a slope or when the vehicle 1 is running down a slope, etc.

(5) The steering handle 3 is operated by the operator or the actuator to change the steering angle, and at the same time the above steps (1) to (4) are carried out, to thereby realize various slip states of the vehicle 1 as encountered when it is turning.

Checking of the operations of parts of the vehicle 1 related to the driving wheel slip control is carried out when the vehicle 1 is under each of the running modes realized as above, by determining whether the checking data input to the computer 38 as monitoring signals show values falling within respective predetermined ranges allowable for the each running mode of the vehicle. More specifically, the output signals from EAT-ECU 6, ENG-ECU 7 and TCS-ECU 8, the signals from the sensor groups $31_a$, $31_b$, and the signals from the right and left driving wheel speed sensors $9_{FR}$, $9_{FL}$ and the steering angle sensor 10 are used as the monitoring signals. Based upon these monitoring signals, checking is carried out as to (1) whether each sensor is normally operating, (2) whether each ECU is normally operating, and (3) whether the automatic transmission 4 and the engine 5 are operating as instructed by the control signals from the ECU's.

By checking the driving wheel slip control system installed in the vehicle 1 as described above, it is possible to determine, for each of the various running modes of the vehicle 1, (1) whether the various sensors, particularly the right and left driving wheel speed sensors $9_{FR}$, $9_{FL}$, and the steering angle sensor 10 are normal, (2) whether the value of the slip value DUTY is proper, which has been calculated by the TCS-ECU 8 based on the detected rotational speeds $W_{FR}$, $W_{FL}$ of the respective right and left driving wheels, the detected rotational speeds $W_{RR}$, $W_{RL}$ of the respective right and left trailing wheels, and the detected steering angle $\delta$, (3) whether decision of leaning or fuel cut of the mixture to be supplied to each cylinder of the engine 5 based on the slip value DUTY (see FIG. 8), and decision of ignition timing, are properly carried out by the ENG-ECU 7 and (4) whether the engine 5 is properly operating in response to the control signals from the ENG-ECU 7.

Therefore, in cases where the driving wheel slip control system is not normally functioning, it can be immediately determined whether this is caused by a sensor, or by an ECU, or by the engine 5 (or a wire connecting the engine 5 to an ECU).

Figure 10:
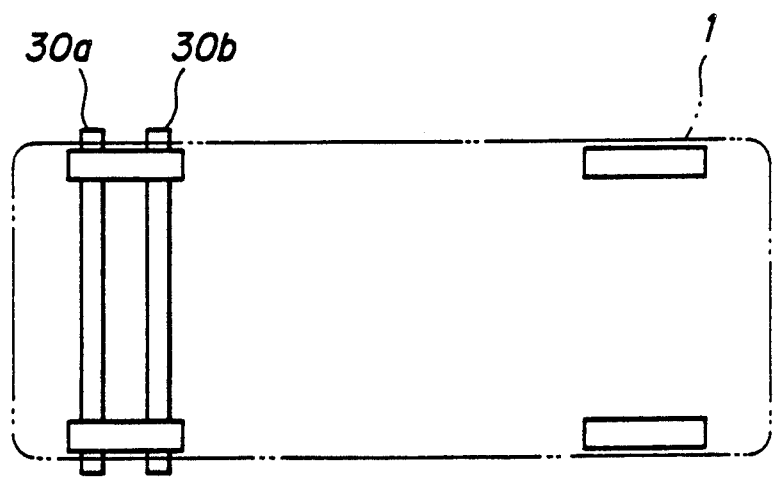
FIG. 10 is a view showing a variation of the support rollers.

Although in the above described embodiment, the support rollers $30_a$, $30_b$ are so constructed that as shown in FIG. 3, they can be rotated about the rotary shaft 54 in unison therewith in horizontal directions to realize a false running state of the vehicle 1 in which it is running while turning. However, the function of rotating the support rollers in horizontal directions may be omitted to realize a false running state of the vehicle in which it is only running straight. In such an alternative arrangement, a pair of right and left support rollers $30_{aR}$, $30_{aL}$ may be integrally formed in a single piece, and also another pair $30_{bR}$, $30_{bL}$ in a single piece, as shown in FIG. 10.

FIG. 11 shows the whole arrangement of a vehicle checking system to which is applied a method according to a second embodiment of the invention.

In FIG. 11, corresponding elements and parts to those in FIG. 1 are designated by identical numerals, and detailed description of which is omitted. This embodiment is distinguished from the above described first embodiment only in the following points:

In this embodiment, support rollers $44_{aR}$, $44_{bR}$, and $44_{aL}$, $44_{bL}$ are provided for supporting trailing wheels $2_{RR}$, $2_{RL}$ of the vehicle 1, respectively. These support rollers $44_a$, $44_b$, and a support roller arrangement including them are identical in construction with those shown in FIG. 3. A motor-driving device 45 is connected to the support rollers $44_{aR}$, $44_{aL}$, for causing rotation of the trailing wheels $2_{RR}$, $2_{RL}$ of the vehicle 1 at desired rotational speeds. Thus, the pulse generator 41 in the first embodiment is omitted.

Wires connecting trailing wheel speed sensors $9_{RR}$, $9_{RL}$ to the TCS-ECU 8 are bifurcated by an attachment 43 to supply signals from these sensors $9_{RR}$, $9_{RL}$ via the preamplifier 39 to the data recorder 40.

In the first embodiment described before, the trailing wheels $2_{RR}$, $2_{RL}$ are not actually rotated, but the pulse generator 41 is used to generate false signals for the signals from the trailing wheel speed sensors $9_{RR}$, $9_{RL}$. However, in this embodiment, the trailing wheels $2_{RR}$, $2_{RL}$ are also supported by the support rollers $44_a$, $44_b$, of which the support rollers $44_{aR}$, $44_{aL}$ containing respective motors actually drive the trailing wheels $2_{RR}$, $2_{RL}$, respectively. Therefore, the trailing wheel speeds $W_{RR}$, $W_{RL}$ are detected by the respective trailing wheel speed sensors $9_{RR}$, $9_{RL}$, and signals indicative of the detected trailing wheel speeds $W_{RR}$, $W_{RL}$ are supplied to the data recorder 40.

Except for the above described points, this embodiment is identical with the first embodiment. Therefore, the same kinds of checking as in the first embodiment can be carried out. Further, operations of the trailing wheel speed sensors $9_{RR}$, $9_{RL}$ can be checked at the same time.

Also in this embodiment, checking of the driving wheel slip control system with the vehicle running while turning may be omitted by omitting the function of rotation of each support roller arrangement in horizontal directions. Further, the right and left support rollers $30_a$, $30_b$ supporting the front wheels and the right and left support rollers $44_a$, $44_b$ supporting the rear wheels may be each formed in a single piece in a manner similar to that shown in FIG. 10.

Further, although in the above embodiments, the support rollers $30_a$ contain the respective motors for exerting running resistance forces upon the driving wheels, this is not limitative, but the support rollers $30_a$ or $30_b$ may be provided with means for mechanically creating resistance forces exerted upon the rollers $30_a$ or $30_b$ and hence braking the driving wheels.

What is claimed is:

1. A method of checking the functioning of a driving wheel slip control system which is installed in a vehicle having driving wheels and trailing wheels, said driving wheel slip control system having a prime mover for driving said driving wheels, at least one driving wheel speed sensor for detecting the rotational speed of at least one of said driving wheels and generating at least one signal indicative of the rotational speed of said at least one driving wheel, at least one trailing wheel speed sensor for detecting the rotational speed of at least one of said trailing wheels and generating at least one signal indicative of the rotational speed of said at least one trailing wheel, and control means responsive to said signals indicative of the rotational speeds of said at least one driving wheel and said at least one trailing wheel for outputting a control signal for controlling the output of said prime mover;

the method comprising the steps of:
(1) placing said driving wheels on support means for rotatably supporting said driving wheels by said support means;
(2) causing said prime mover to rotatively drive said driving wheels;
(3) supplying at least one false signal indicative of the rotational speed of said at least one trailing wheel to said control means in place of said at least one signal indicative of the rotational speed of said at least one trailing wheel;
(4) taking out predetermined monitoring signals including at least said control signal outputted from said control means, from said driving wheel slip control system; and
(5) determining whether said predetermined monitoring signals show values falling within respective predetermined allowable ranges.

2. A method of checking the functioning of a driving wheel slip control system which is installed in a vehicle having driving wheels, trailing wheels, and a steering handle, said driving wheel slip control system having a prime mover for driving said driving wheels, at least one driving wheel speed sensor for detecting the rotational speed of at least one of said driving wheels and generating at least one signal indicative of the rotational speed of said at least one driving wheel, at least one trailing wheel speed sensor for detecting the rotational speed of at least one of said trailing wheels and generating at least one signal indicative of the rotational speed of said at least one trailing wheel, a steering angle sensor for detecting a steering angle of said steering handle and generating a signal indicative of said steering angle, and control means responsive to said signals indicative of the rotational speeds of said at least one driving wheel and said at least one trailing wheel and said steering angle for outputting a control signal for controlling the output of said prime mover;

the method comprising the steps of:
(1) placing said driving wheels on support means for rotatably supporting said driving wheels by said support means;
(2) causing said prime mover to rotatively drive said driving wheels;
(3) supplying at least one false signal indicative of the rotational speed of said at least one trailing wheel to said control means in place of said at least one signal indicative of the rotational speed of said at least one trailing wheel;
(4) turning said steering handle;
(5) taking out predetermined monitoring signals including at least said control signal outputted from said control means, from said driving wheel slip control system; and
(6) determining whether said predetermined monitoring signals show values falling within respective predetermined allowable ranges.

3. A method according to claim 2, wherein said predetermined monitoring signals include said signal indicative of said steering angle.

4. A method according to any one of claims 1 or 2, wherein said predetermined monitoring signals include said at least one signal indicative of the rotational speed of said at least one driving wheel.

5. A method according to any one of claims 1 or 2, wherein said predetermined monitoring signals include at least one signal indicative of operating conditions of said prime mover.

6. A method according to claim 2, wherein said predetermined monitoring signals include said at least one signal indicative of the rotational speed of said at least one trailing wheel and said signal indicative of said steering angle.

7. A method according to claim 2, wherein said predetermined monitoring signals include said signal indicative of said steering angle and at least one signal indicative of operating conditions of said prime mover.

8. A method according to claim 2, wherein said predetermined monitoring signals include said at least one signal indicative of the rotational speed of said at least one trailing wheel, said signal indicative of said steering angle, and at least one signal indicative of operating conditions of said prime mover.

* * * * *